United States Patent [19]
Holcombe, Jr. et al.

[11] Patent Number: 5,668,072
[45] Date of Patent: Sep. 16, 1997

[54] HIGH EMISSIVITY COATING

[75] Inventors: Cressie E. Holcombe, Jr.; Lloyd R. Chapman, both of Knoxville, Tenn.

[73] Assignee: Equity Enterprises, Oak Ridge, Tenn.

[21] Appl. No.: 647,133

[22] Filed: May 9, 1996

[51] Int. Cl.$^6$ .................................................... C04B 35/50
[52] U.S. Cl. .................. 501/152; 106/14.05; 106/14.12; 106/14.44
[58] Field of Search .................. 501/152; 106/14.05, 106/14.12, 14.44

[56] References Cited

U.S. PATENT DOCUMENTS

| | | | |
|---|---|---|---|
| 4,319,924 | 3/1982 | Collins, Jr. et al. | 106/14.12 |
| 5,316,854 | 5/1994 | Lin et al. | 501/64 |

OTHER PUBLICATIONS

Y. S. Touloukian and D. P. DeWitt, "Thermal Radiative Properties: Nonmetallic Solids", *Thermophysical Properties of Matter*, 8, 225–230 (1972) no month.

Y. S. Touloukian, R. K. Kirby, R. E. Taylor, and T. Y. R. Lee, "Thermal Expansion: Nonmetallic Solids", *Thermophysical Properties of Matter*, 13, 212–216 (1977) no month.

R. A. Burford and J. B. Fowler, "Ceramic, Black–Body, High Emissivity Coatings for Improved Efficiency of Fired Heaters", *Heat Resistant Materials II*, ASM Intl., Materials Park, OH, 453–456, (1995) no month.

J. G. Clements, "How Refractory Structures Work and the Importance of Emissivity", *Glass International*, p. 44 (Mar. 1985).

J. G. Clements, "Spray–on Furnace Efficiency", *CME*, p. 41, Jul./Aug. 1985.

Greg Fisher, "Ceramic Coatings Enhance Performance Engineering", *Ceramic Bulletin*, vol. 65, No. 2, 283–287, (1986) no month.

"Single Oxides: Ti, Cr", *Engineering Property Data on Selected Ceramics vol. III, Single Oxides*, Metals and Ceramics Information Center Battelle, Columbus, OH, (Jul. 1981).

"Lanthanum Chromite: New Properties", *High Temperature Technology*, Butterworths, London, p. 229, (1967) no month.

"Intermetallic Materials", *Ceramics for Advanced Technologies*, John Wiley & Sons, New York/London/Sydney, p. 152, (1965) no month.

Barry T. Kilbourn, "Nitrates/Oxalates/Oxides", *A Lanthanide Lanthonology, Part II, M–Z*, Molycorp, Inc., White Plains, NY, pp. 12, 16–18 (1994) no month.

"Oxide Ceramics", *High–Temperature Materials and Technology*, John Wiley & Sons, New York/London/Sydney, p. 277, (1967) no month.

Barry T. Kilbourn, "Introduction", *Cerium: A Guide to Its Role in Chemical Technolgy*, Molycorp, Inc., White Plains, NY, 1–16, (1992) no month.

Barry T. Kilbourn, "Acetates/Bastnasite/Cerium/Cerium Concentrate/Cerium Oxide/Hydroxides, Hydrates/Ion Adsorption Ores/Lanthanum Concentrate", *A Lanthanide Lanthanology, Part I, A–L*, Molycorp, Inc., White Plains, NY, pp. 3, 4, 15–17, 26–30, 54–57 (1993) no month.

*Primary Examiner*—Karl Group
*Attorney, Agent, or Firm*—Pitts & Brittian, P.C.

[57] ABSTRACT

A high emissivity coating for coating the interior of a furnace to direct thermal energy toward a load in the furnace wherein the furnace operates above 1100° C. The high emissivity coating includes a high emissivity agent and a binder agent. The preferred high emissivity agent is cerium oxide which defines a high emissivity factor from approximately 1000° C. to above 2000° C. The binder suspension agent is formulated to define the consistency and drying characteristics of paint such that the coating can be applied in a manner similar to the manner in which paint is applied. Moreover, the binder/suspension agent withstands the final use temperature.

18 Claims, No Drawings

HIGH EMISSIVITY COATING

TECHNICAL FIELD

This invention relates to the field of high emissivity ceramic coatings and more specifically to a cerium based coating.

BACKGROUND ART

Ceramic coatings have been used for many years in a variety of industries. One particular use of ceramic coatings is in the field of furnace refractories. Specifically, ceramic coatings with high emissivity are applied to the interior of a furnace to improve the efficiency of the furnace.

Generally, high emissivity coatings are comprised of a refractory pigment, a high emissivity additive and a binder/suspension agent. Typical refractory pigments include zirconia, zirconia silicate, aluminum oxide, aluminum silicate, silicon oxide, etc. The high emissivity additive is typically a transition metal oxide such as chromium oxide ($Cr_2O_3$), cobalt oxide ($CoO_x$), ferrous oxide ($Fe_2O_3$), and nickel oxide (NiO). In some coatings, the refractory pigment and the high emissivity additive are the same material.

The binder/suspension agent allows the coating to be applied like ordinary housepaint and withstands the anticipated use temperature. The binder/suspension agent acts like a high temperature glue and is typically an aqueous solution or suspension of silicates or phosphates.

Several characteristics of a ceramic coating determine whether it can be successfully applied to a particular substrate. Typically, thermal expansion matching, mechanical bonding, chemical bonding, and surface stress characteristics have been considered as well as factors such as high temperature properties, corrosion resistance and wear resistance. Traditionally, the key concern for coatings to be applied in variant temperature conditions was the match of thermal expansion coefficients for the coating and the substrate. The emphasis on thermal expansion teaches away from using materials with high coefficients of thermal expansion. Cost is another factor which is considered when coatings are produced. If the coating is more costly than the projected energy savings then the coating is not cost effective.

When a high emissivity coating is applied to the interior surface of a furnace, the thermal radiation properties of the refractory are enhanced thereby reducing fuel consumption and allowing increased product throughput without increasing the average furnace temperature. A high emissivity coating allows thermal energy to be directed and redirected toward the furnace working zone and thereby best utilize the thermal energy for the workpieces contained in the furnace. The coating reduces the exterior temperature of the furnace since the thermal energy is kept within the hot zone and is not lost in the insulation and through the furnace walls.

The heat treating industry has incorporated the use of high emissivity coatings in furnaces. The heat treating industry typically operates at temperatures up to 1100° C. The coatings, which are typically chromium oxide based, are effective and stable at temperatures under 1100° C. Unfortunately, at higher temperatures these coatings disintegrate over a relatively short period of time. Specifically, chromium oxide vaporizes at temperatures over 1100° C. Moreover, other standard transition metal oxide high emissivity additions also have high vaporization characteristics as well as fluxing characteristics, whereby the entire mixture is lowered in overall melting point, preventing high temperature use for long periods of time.

The petrochemical industry is an example of an industry which utilizes temperatures up to 1650° C. (3000° F.) to process ethane, propane and similar hydrocarbons in a thermal-cracking process with steam to form ethylene and propylene. It is desirable to use a high emissivity coating in the thermal-cracking furnaces which can effectively withstand the higher temperatures and can save fuel through better thermal efficiency as well as evening out the hot zone (providing a more uniform furnace temperature).

High emissivity coatings are also useful in the glass industry in large glass furnaces. Moreover, high emissivity coatings are useful in large steel melting furnaces.

Therefore, it is an object of the present invention to provide a high emissivity coating which can be utilized to increase the efficiency of a furnace at temperatures above 1100° C.

It is another object of the present invention to provide a high emissivity coating which is durable at temperatures above 1100° C.

Further, it is an object of the present invention to provide a high emissivity coating which has a consistency similar to that of housepaint and applied in the same manner as housepaint.

It is yet another object of the present invention to provide a high emissivity coating which is economical.

Moreover, it is another object of the present invention to provide a high emissivity coating which is durable in reactive atmospheres.

SUMMARY

Other objects and advantages will be accomplished by the present invention which provides a high emissivity coating which is durable when applied to the interior of furnaces operating above 1100° C. The high emissivity coating of the present invention includes a high emissivity agent and a binder/suspension agent. The high emissivity agent is a rare earth based oxide wherein the rare earth is cerium or terbium. The preferred high emissivity agent is cerium oxide which defines a high emissivity from approximately 1000° C. to above 2000° C. The binder suspension agent is formulated to define the consistency and drying characteristics of paint such that the coating can be applied in a manner similar to the manner in which paint is applied. Moreover, the binder/suspension agent withstands the final use temperature.

DESCRIPTION OF PREFERRED EMBODIMENT

According to the present invention, a high emissivity coating is provided with advantages over high emissivity coatings of the prior art. The high emissivity coating of the present invention is designed for use in furnaces for increasing the efficiency of the furnace. Moreover, the coating of the preferred embodiment is economical to produce and can be utilized for extended periods of time at temperatures above 1100° C. without degradation.

It is well known in the art that "blackbody" or high emissivity coatings for coating the interior of a furnace are desirable for improving the efficiency of the furnace. Further, it is desirable to have a coating which is equally adherent to ceramic surfaces and metal surfaces. It is also desirable to have a coating which exhibits durability, adequate hardness/abrasion resistance and stability in reactive environments. Moreover, it is desirable that the coating have an emissivity approaching 1.0 in the operating temperature range.

A high emissivity coating is generally comprised of a refractory pigment, a high emissivity agent and a binder/suspension agent, as discussed above. Preferably, the coating defines a consistency such that it can be applied like paint. The high emissivity agent in the coating of the present invention is a rare earth based oxide wherein the rare earth is cerium or terbium.

Cerium oxide ($CeO_2$) is the preferred high emissivity agent. Cerium oxide has a melting point of 2750K (2477° C.) and exhibits an emissivity of approximately 0.9 from 1000° C. to at least 2000° C. Cerium oxide exhibits an unusually high thermal expansion for a refractory material. Cerium oxide also exhibits a chemical resistance to both acids and bases and therefore cerium oxide can be utilized with acidic, neutral or basic binder/suspension systems. Moreover, cerium oxide is economically feasible to use in high emissivity coatings.

Cerium oxide is provided in powder form and typically has a particulate size of about 3 to 15 micrometers, although finer and coarser particles are occasionally available and are usable in the coating of the present invention. It will be noted that there are advantages of less shrinkage and better paintability if the particulate range is within the 3 to 15 micrometers. Cerium oxide is typically available in 95 to 99.99 weight percent pure. It will be noted that the present invention is not limited to such grades of high purity cerium oxide. Mixed oxides of cerium oxide (i.e. cerium oxide-aluminum oxide, cerium oxide-silicon oxide) are usable as well as lesser pure forms of cerium oxide which contain other rare earths. Moreover, precursors to cerium oxide such as hydrated cerium oxide ($CeO_2*H_2O$), cerium hydroxide [$Ce(OH)_3$], nitrates, acetates, hydroxynitrates, etc. are recognized as forming cerium oxide on heating to 500° C. and can be used instead of cerium oxide. Cerium oxide typically refers to cerium (IV) oxide (cerium dioxide or $CeO_2$) but can include cerium (III) oxide (cerium sesquioxide or $Ce_2O_3$). The anticipated maximum use-temperature of cerium dioxide ($CeO_2$) is 2000° C. and higher, whereas cerium (III) oxide ($Ce_2O_3$) is about 1650° C.

In the high emissivity coating of the present invention, cerium oxide ranges from approximately 5 weight percent to 75 weight percent in the liquid paintable coating. Although a higher weight percent is suitable for use, the consistency of the liquid paintable coating becomes paste-like beyond 75 weight percent cerium oxide.

It will be noted that although the use of cerium is emphasized it is not intended to limit the present invention to this one rare earth. Terbium is a rare earth which is similar to cerium and can also be utilized as a high emissivity agent in the present invention. A disadvantage to the use of terbium is that it is expensive and is not economically feasible for use.

The preferred constituents and ratios of the binder/suspension agent are 40–70 weight percent aluminum phosphate solution, 25–45 weight percent peptized aluminum oxide monohydrate and 5–15 weight percent ethyl alcohol. In the preferred embodiment, the binder/suspension agent is comprised of 55 weight percent aluminum phosphate solution, 35.4 weight percent peptized aluminum oxide monohydrate (PAOM) and 9.6 weight percent ethyl alcohol.

In the preferred embodiment, the aluminum phosphate solution is a commercial binder Albrite "MALP" liquid manufactured by Albright & Wilson Company. The "MALP" liquid is generally comprised of 57 weight percent monoaluminum phosphate trihydrate [$Al(H_2PO_4)_3$], 2 weight percent phosphoric acid, and 41 weight percent water.

The preferred form of the peptized aluminum oxide monohydrate is described in U.S. Pat No. 5,320,984, and is prepared by mixing 5 grams of aluminum oxide monohydrate into 75 grams of water and adding 2.5 of concentrated nitric acid while stirring. This peptizing creates a dispersed phase of ultrafine particulate material similar to colloidal material.

In the preferred embodiment, the high emissivity liquid paintable coating includes 51.6 weight percent cerium oxide powder and 48.4 weight percent of the preferred binder/suspension agent. The 48.4 weight percent liquid composition consists of 26.6 weight percent "MALP" liquid, 17.1 weight percent PAOM liquid, and 4.7 weight percent ethyl alcohol. When mixed in these proportions, the coating has a consistency similar to that of paint such that the coating can be applied like paint.

The "MALP" liquid has 41.7 weight percent nonvolatiles (solids formed when heating to 500° C.) and the PAOM liquid has 5.3 weight percent nonvolatiles. This paintable coating leads to an as-dried (at 500° C.) composition of: 81.1 weight percent cerium oxide, 4.8 weight percent aluminum oxide and 14.1 weight percent phosphorous oxide.

The binder/suspension agent discussed above defines a melting point of approximately 2050° C. Specifically, the phosphorus oxide vaporizes at approximately 1650° C. but does not affect the aluminum oxide which defines a melting point of 2050° C.

It will be noted that although a preferred form of the binder/suspension is disclosed above, the binder/suspension agent can include solutions/suspensions based on a variety of other materials. Specifically, binders which are suitable for incorporating cerium oxide include low levels (0.5 to 3 weight percent) of cellulosic binders (sodium carboxymethylcellulose, hydroxypropylcellulose, etc.), or refined bentonite or hectorite in a water medium. Also, mixed oxide binders such as sodium silicate, potassium silicate, lithium silicate solutions, and conventional colloidal suspensions or aqueous binder solutions are suitable with the cerium oxide; these may, however, reduce the use-temperature to the lower end of the desired range. High temperature binders such as colloidal binders (namely colloidal silica and colloidal alumina wherein colloidal refers to small particles, typically equal to or less than 0.05 micrometers, dispersed in water as sols or hydrosols) or aqueous solutions of pure materials such as aluminum phosphate, aluminum nitrate, zirconium nitrate, zirconium acetate, and yttrium nitrate may be used. Further, any combination of the binder/suspension agents as well as any acidic, neutral, or basic binder suspension agent system which will achieve a final use-temperature in the range of 1000°–2000° C. and is stable with the cerium oxide can be used. Inert liquids such as water, ethyl alcohol or others can be used to develop the correct viscosity and drying characteristics such that the coatings act like housepaint.

A binder/suspension system for higher purity includes ethyl alcohol, ethyl acetoacetate and cellulosic binder. When cerium oxide is the high emissivity agent, the preferred weight percentages are 18.6% ethyl alcohol, 18.6% ethyl acetoacetate, 0.8% cellulosic binder and 62.0% cerium oxide. When dried to 500° C., the coating is comprised of 99.7 weight percent cerium oxide and 0.3 weight percent carbon. When heated above 500° C., the carbon oxidizes leaving the coating with 99.9 weight percent cerium oxide (assuming that 99.9% pure cerium oxide is used). With terbium oxide as the high emissivity agent, the preferred weight percentages 17.9% ethyl alcohol, 17.9% ethyl acetoacetate, 0.8% cellulosic binder and 63.3% terbium oxide. When dried to 500° C., the coating includes 99.7 weight percent terbium oxide and 0.3 weight percent carbon. When the coating is dried above 500° C., the carbon oxides away and the coating is 99.9 weight percent terbium oxide (assuming that 99.9% pure terbium oxide is used).

An example on a non-aqueous paint, which upon drying leaves about 1% magnesium silicate clay, is comprised of ethyl alcohol, acetone, cellulosic binder, clay binder and a high emissivity agent. With 1 weight percent magnesium silicate clay in the coating, there is not enough to create a large liquid phase such that the coating can be heated to the melting point of the high emissivity agent.

With cerium oxide serving as the high emissivity agent, the preferable paint composition is 31.2 weight percent ethyl alcohol, 7.4 weight percent acetone, 2.5 weight percent cellulosic binder, 0.8 weight percent clay binder and 58.1 weight percent cerium oxide. When the paint is dried to 500° C., it is comprised of 98.1 weight percent cerium oxide, 0.8 weight percent carbon and 1.0 weight percent magnesium silicate. When the coating is heated above 500° C. in air, the carbon oxidizes and yields 99.0 weight percent cerium oxide and 1.0 weight percent magnesium silicate.

With the high emissivity agent being terbium oxide, the preferable composition of the paint is 30.2 weight percent ethyl alcohol, 7.1 weight percent acetone, 2.4 weight percent cellulosic binder, 0.8 weight percent clay binder and 59.5 weight percent terbium oxide. When dried to 500° C., the coating is comprised of 97.9 weight percent terbium oxide, 1.0 weight percent carbon and 1.1 weight percent magnesium silicate. When heated above 500° C. in air, the carbon oxidizes and yields 98.9 weight percent terbium oxide and 1.1 weight percent magnesium silicate.

The preferred coating is created by mixing the cerium oxide which is in powder form with the binder/suspension agent to create a "housepaint-like" coating. The coating is then applied like housepaint (brush, airspray, etc.) to the surfaces that will see the high temperatures, typically the interior areas of high temperature furnaces and the furnace interior components. The coatings are generally 10–250 microns thick. After the coating is dry to the touch, the furnace is ready to use.

It will be noted that the coating of the preferred embodiment includes ingredients that are volatile and must be outgassed away as the furnace heats up. Moreover, the coating ingredients do not cause spalling of the coating. Additionally, the inorganic ingredients of the coating act as a high-temperature glue, allowing the cerium oxide to bond to the substrate (ceramic or metal) tenaciously through a long use time, generally one to five years.

The binder/suspension agent of the preferred embodiment serves to bond the cerium oxide to a ceramic substrate in a manner such that the high thermal expansion of cerium oxide is not a concern. The cerium oxide coating breathes with the ceramic refractory to which it is applied. Of course, a high thermal expansion is necessary when applying a ceramic coating to a metal.

It will be noted that for inorganic binders the amount of the cerium oxide must be such that there is at least 5 weight percent cerium oxide in the dried or sintered material. If only organic binders are used, typically only a low percentage of the organic is dissolved in water, such that the cerium oxide content of the dry paint will be high, possibly up to 99 weight percent; however, the cerium oxide must bond to the substrate by high-temperature diffusion/reaction since there is no inorganic binder to aid in gluing the cerium oxide to the substrate.

The effectiveness of cerium oxide as a high emissivity agent for temperatures above 1000° C. was illustrated via a comparative evaluation where three separate coatings were prepared and applied, in sections, to the interior of a furnace. Each coating included the same binder/suspension agent (the binder/suspension agent of the preferred embodiment). The only variable between each coating was the high emissivity agent which also served as the refractory pigment in each coating. The high emissivity agents were chromium oxide, silicon carbide and cerium oxide. After a year of furnace operation at 1400° C.–1500° C., the green chromium oxide had disappeared. Likewise, the gray-to-black silicon carbide had turned to a whitish, dusty coating. The cerium oxide coating appeared unchanged from when it was applied.

Moreover, further testing showed a 3 to 6% increase in the overall efficiency of the furnace with a marked reduction in the exterior temperature of the furnace showing that less heat is lost through the insulation and that the thermal energy is directed toward the load within the furnace. Specifically, the product reached a higher average temperature in a coated furnace with the same thermal input. In the petrochemical industry, fuel costs run in the hundreds of thousands of dollars. A 3 to 6% increase in overall fuel efficiency can substantially reduce costs.

From the foregoing description, it will be recognized by those skilled in the art that a high emissivity coating offering advantages over the prior art has been provided. Specifically, the high emissivity coating increases the efficiency of a furnace and is durable for long periods of time in a reactive atmosphere at temperatures above 1000° C. Further, the high emissivity coating defines a consistency and drying characteristics similar to that of housepaint and applied in the same manner as housepaint. Moreover, the high emissivity coating is economical.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A high emissivity coating composition for coating selected surfaces in a furnace wherein the furnace operates above 1000° C., said high emissivity coating composition comprising:
   a high emissivity agent being based on a rare earth oxide wherein said rare earth is selected from the group consisting of cerium and terbium; and,
   a binder agent for mixing with said high emissivity agent such that said high emissivity agent is adhereable to the selected surfaces in the furnace, said binder agent being comprised of about 40–70 weight percent aluminum phosphate solution, about 25–45 weight percent peptized aluminum oxide monohydrate, and about 5–15 weight percent ethyl alcohol.

2. The high emissivity coating composition of claim 1 which is comprised of 5 to 75 weight percent of said high emissivity agent and 25 to 95 weight percent of said binder agent.

3. The high emissivity coating composition of claim 1 wherein said high emissivity agent is cerium oxide.

4. The high emissivity coating composition of claim 1 wherein said binder agent defines a viscosity and drying characteristics similar to paint such that said high emissivity coating is applied like paint.

5. The high emissivity coating composition of claim 1 wherein said binder agent is stable to at least approximately 1650° C.

6. The high emissivity coating composition of claim 1 wherein said binder agent binds said high emissivity agent to the selected surfaces in the furnace to which said coating composition is applied when the furnace is heated to the operating temperature range.

7. The high emissivity coating composition of claim 1 wherein said high emissivity agent is cerium oxide, said coating composition being comprised of about 51.6 weight percent cerium oxide and about 48.4 weight percent of said binder agent.

8. The high emissivity coating composition of claim 1 containing from 5 to 99.9 weight percent of said rare earth oxide when said coating composition is dried.

9. The high emissivity coating composition of claim 1 containing 81.1 weight percent cerium oxide when said coating composition is dried.

10. A high emissivity coating composition for coating selected surfaces in a furnace wherein the furnace operates above 1000° C., said high emissivity coating composition comprising:

a high emissivity agent being based on a rare earth oxide wherein said rare earth is cerium; and, a binder agent for mixing with said high emissivity agent such that said high emissivity agent is adhereable to the selected surfaces in the furnace, said binder agent being comprised of about 40–70 weight percent aluminum phosphate solution, about 25–45 weight percent peptized aluminum oxide monohydrate, and about 5–15 weight percent ethyl alcohol.

11. The high emissivity coating composition of claim 10 which is comprised of 5 to 75 weight percent of said high emissivity agent and 25 to 95 weight percent of said binder agent.

12. The high emissivity coating composition of claim 10 wherein said binder agent defines a viscosity and drying characteristics similar to paint such that said high emissivity coating composition is applied like paint.

13. The high emissivity coating composition of claim 10 wherein said binder agent is stable to at least approximately 1650° C.

14. The high emissivity coating composition of claim 10 wherein said binder agent binds said high emissivity agent to the interior of the furnace when the furnace is heated to the operating temperature range.

15. The high emissivity coating composition of claim 10 wherein said coating composition being comprised of about 51.6 weight percent cerium oxide and about 48.4 weight percent of said binder agent.

16. The high emissivity coating composition of claim 10 containing from 5 to 99.9 weight percent of said rare earth oxide when said coating composition is dried.

17. The high emissivity coating composition of claim 10 containing 81.1 weight percent cerium oxide when said coating composition is dried.

18. The high emissivity coating composition of claim 1 wherein said high emissivity agent defines a particulate size of about 3 microns to about 15 microns.

* * * * *